Nov. 4, 1941.   W. J. ELVIN ET AL   2,261,239
TEXTILE APPARATUS
Filed Aug. 21, 1940   5 Sheets-Sheet 1

INVENTORS
WILLIAM J. ELVIN
RAYMOND D. REEL
ELMER R. STAHL
FRANK W. SCHULTE
ATTORNEYS

Nov. 4, 1941. W. J. ELVIN ET AL 2,261,239
TEXTILE APPARATUS
Filed Aug. 21, 1940   5 Sheets-Sheet 2

INVENTORS
WILLIAM J. ELVIN
RAYMOND D. REEL
ELMER R. STAHL
FRANK W. SCHULTE
BY
ATTORNEYS

Nov. 4, 1941.    W. J. ELVIN ET AL    2,261,239
TEXTILE APPARATUS
Filed Aug. 21, 1940    5 Sheets-Sheet 3

INVENTORS
WILLIAM J. ELVIN
RAYMOND D. REEL
ELMER R. STAHL
FRANK W. SCHULTE
BY
ATTORNEYS

Nov. 4, 1941.   W. J. ELVIN ET AL   2,261,239
TEXTILE APPARATUS
Filed Aug. 21, 1940   5 Sheets-Sheet 5

INVENTOR
WILLIAM J. ELVIN
RAYMOND D. REEL
ELMER R. STAHL
FRANK W. SCHULTE
BY
ATTORNEYS

Patented Nov. 4, 1941

2,261,239

UNITED STATES PATENT OFFICE 2,261,239

TEXTILE APPARATUS

William J. Elvin, Frostburg, Md., Raymond D. Reel, Keyser, W. Va., Elmer R. Stahl, Meyersdale, Pa., and Frank W. Schulte, Cumberland, Md., assignors to Celanese Corporation of America, a corporation of Delaware Application August 21, 1940, Serial No. 353,534

14 Claims. (Cl. 57—75)

This invention relates to the production of yarn packages, and relates more particularly to apparatus for winding yarn packages, such as bobbins, with a magazine wrap or transfer tail. A magazine wrap or transfer tail as commonly understood in the textile art is the inner end and supplementary length of the first yarn wound on the yarn support and is so disposed as to be positively and safely secure during the winding of the yarn package yet freely available for tying directly to the outer end of the yarn on another package for the purpose of smoothly effecting a transfer from a depleted to a full adjacent yarn package without stoppage or interruption in the delivery of the yarn being taken from the creel or other yarn package holder on which both packages are supported.

It is an important object of this invention to provide simple, efficient and inexpensive apparatus for winding yarn on a bobbin with a magazine wrap or transfer tail.

In its broadest aspect the present invention comprises the provision of means adapted to be attached to a ring spinning device whereby warping bobbins having a slotted base flange with a peripherally grooved barrel extension for communicating the magazine wrap or transfer tail may have yarn wound on said flange for the purpose of supplying the magazine wrap or transfer tail.

Another object of this invention is the provision of means for automatically or semi-automatically applying yarn to a bobbin to form a magazine wrap or transfer tail while the bobbin is revolving at a high rate of speed.

A further object of this invention is the provision of means for accurately and dependably applying yarn to a bobbin to form a magazine wrap or transfer tail with the use of a minimum length of yarn.

Other objects of this invention will appear from the following detailed description and drawings.

In the accompanying drawings, wherein the preferred embodiments of our invention are shown.

Like reference numerals indicate like parts throughout the several views of the drawings.

Referring now to the drawings, and more particularly to Figs. 1 to 4, a yarn 20, coming from any suitable source of supply such as a metier or spinning cabinet (not shown), passes downward and is threaded through a traveler 21 mounted on a spinning ring 22. The spinning ring 22 is mouted in a split ring holder 23 and held by means of threaded screw 24 which may be adjusted to tighten the grip of the ring holder 23 about the spinning ring 22.

Figure 1:
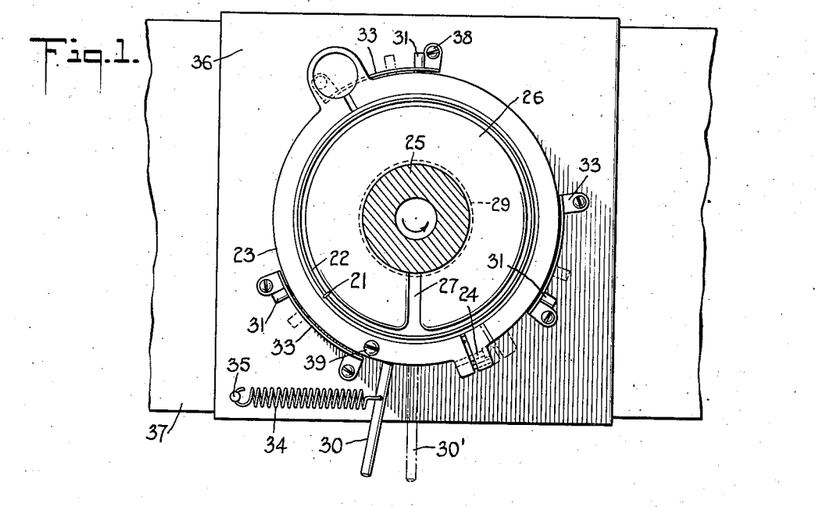
Fig. 1 is a plan view of one embodiment of our invention, showing the apparatus for applying the yarn to the extension on the bobbin to form the magazine wrap or transfer tail carried by the ring rail of a ring spinning device.
Figure 2:
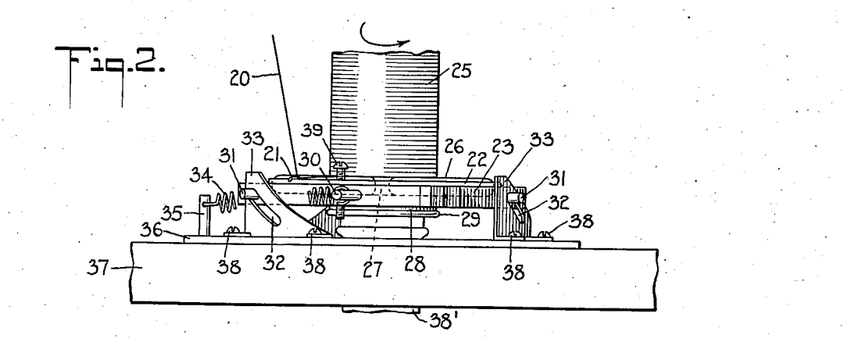
Fig. 2 is a front elevational view of the modification shown in Fig. 1 with the ring rail and bobbin partly broken away, showing the position of the attachment prior to or subsequent to the application of yarn to the bobbin extension.
Figures 3, 4:
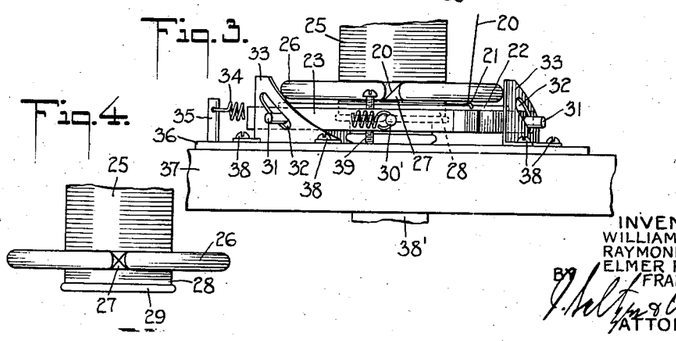
Fig. 3 is a view similar to that of Fig. 2, showing the position of the attachment while the yarn is being applied to the bobbin extension.
Fig. 4 is a fragmentary detailed view of a bobbin showing the yarn wrapped on the bobbin extension.
Figure 5:
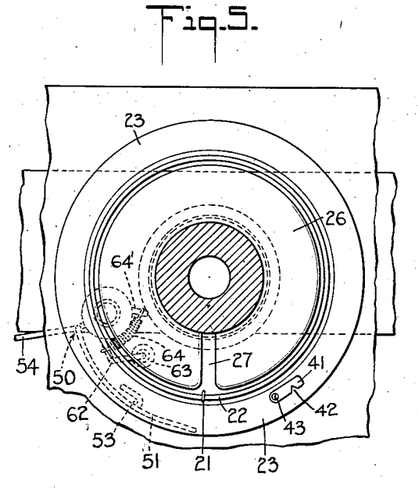
Fig. 5 is a plan view of a modified form of our invention, showing the bobbin and an adjustable yarn guide by which the yarn is moved into position to form the magazine wrap or transfer tail on the bobbin extension.

The bobbin 25 upon which the yarn is to be wound is provided at its lower extremity with a smoothly finished flange 26 containing a radial slot 27. Below the flange 26 of the bobbin 25 is a short extension 28 preferably having a beaded edge 29. The extension 28 is the portion which is adapted to hold the magazine wrap or transfer tail. The upper flange on the bobbin 25 is of the usual type, i. e. free from slots.

Where no magazine wrap or transfer tail is desired the yarn 20 passing through the traveler 21 is thrown on to the rotating bobbin 25 by the usual thrown-on technique used in normal ring twister practice and winds on the bobbin 25 on the portion above the slotted flange 26 as shown in Fig. 2. However, in order to obtain the magazine wrap or transfer tail the lever 30 integral with ring holder 23 is moved to the position 30' as shown in Figs. 1 and 3 by any suitable means which may be manual, semi-automatic or automatic. This movement of lever 30 to the position 30' causes pins 31 integral with ring holder 23 to ride downwardly in helical slots 32, formed in a series of curved upright members 33 uniformly spaced about the ring holder, thereby lowering the spinning ring and ring holder from the position shown in Fig. 2 to that shown in Fig. 3. The circumferential and downward movement of the ring and ring holder is opposed by the tension of a spring 34, one end of which is suitably attached to lever 30 and the other end attached to an anchoring stud 35. The stud 35 is attached to the assembly base plate 36 while the guides 33 are attached through the base plate 36 and to the ring rail 37 as by screws 38.

The movement of the lever 30 to the position 30' is caused to take place when the traversing ring rail 37 is at the bottom of its stroke. When the lever 30 is displaced and the ring 22 and ring holder 23 are caused to lower, the yarn 20, which has been thrown on and wound for several revolutions on the bobbin 25 is guided downward through the radial slot 27 as shown in Fig. 3 and now winds on the extension 28 below the slotted flange 26. After the yarn 20 has described several revolutions about the extension 28 and is securely gripped thereon, the lever is released and is returned from position 30' to lever position 30 by the action of the spring 34. This movement causes the spinning ring 22 and ring holder 23 to rise due to the movement of guide pins 31 along helical slots 32 in guides 33 with the result that the yarn 20 is now guided upward through the radial slot 27 and is again wound on the bobbin 25 above slotted flange 26 by the rotation of the bobbin. Thus, as shown in Fig. 4, the magazine wrap or transfer tail is formed by the yarn passing downwardly through the radial slot 27, being wound on the extension 28 and then passing upwardly through radial slot 27, the movements of the yarn being controlled by the motion of the ring and ring holder as described.

The bobbin is rotated in the usual manner by a spindle 38' upon which it is set and which is driven by any suitable means (not shown). While the path of the guide pins 31 is confined to the helical slots 32, the extent to which the spinning ring 22 and ring holder 23 may be moved downward by movement of the lever 30 may be adjustably controlled by a screw 39 threaded into and passing through the ring holder 23. When the spinning ring 22 and ring holder 23 are lowered by the movement of lever 30 to the position 30', the lower end of the screw 39 comes into contact with the assembly base plate 36 and prevents further downward motion. In addition, screw 39 serves to prevent any undue jarring of the guide pins 31 against guides 33 at the base of the helical slot 32 when the ring is lowered by movement of the lever 30 to the position 30'.

The magazine wrap or transfer tail applied to a yarn package in this manner is safely and firmly secured and there is no danger of it becoming unwrapped when the package is handled during packing, shipping, etc.

Referring now to Figs. 5 to 9, in which another embodiment of our invention is shown, the yarn 20 is threaded downwardly through a traveler 21, looped around fixed wire yarn guides 40, passed upward in contact with a guide 41 provided with a V-shaped notch 42 the edges of which are sharpened for a purpose hereinafter set forth. The traveler is mounted on a ring 22 which is held in a ring holder 23. The notched yarn guide 41 is mounted on ring holder 23 and held in position by a screw 43.

Figure 7:
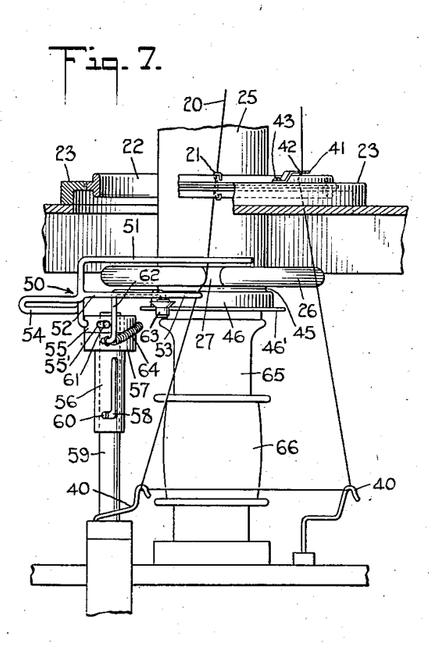
Fig. 7 is a front elevational view of the mechanism, with the ring rail and bobbin partly broken away, showing the ring and traveler, the adjustable yarn guide carried on a sleeve for controlled movement, and the sliding collar on the bobbin extension for holding the magazine wrap or transfer tail which is formed.
Figure 8:
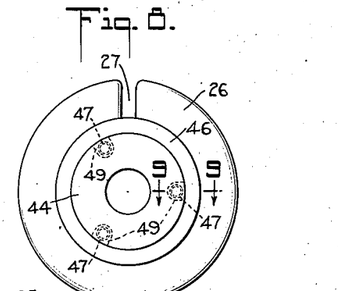
Fig. 8 is a plan view of the base of the type of bobbin used in connection with our invention showing the bobbin base and a circumferential collar for holding the yarn which forms the magazine wrap or transfer tail in position.
Figure 9:
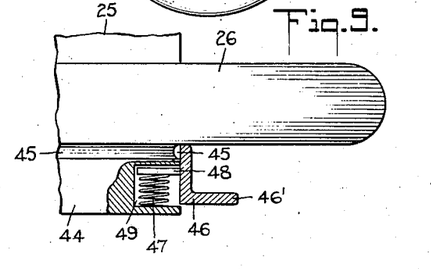
Fig. 9 is a fragmentary view of the base of the bobbin upon which the magazine wrap is applied on an enlarged scale and taken along line 9—9 of Fig. 8, showing the manner in which the movable collar is held in position.

The bobbin 25, as shown particularly in Figs. 7, 8 and 9, upon which the magazine wrap or transfer tail is to be applied is provided at its lower extremity with a flange 26 having a radial slot 27. Below the flange 26 is a short extension 44 having a circumferential groove 45 cut therein and provided with a circular metal shield 46 having an integral flange 46'. The metal shield 46 is mounted on the extension 44 so as to be displaceable in a downward direction against the pressure of a plurality of springs 47 acting on lugs 48 attatched to the metal shield 46. The springs 47 are retained in hollow chambers 49 which are uniformly spaced circumferentially about the periphery of the extension 44 as is shown in Fig. 8. Any pressure on the flange 46' of the metal shield 46 causes it to be displaced downwardly exposing the circumferential groove 45. When the pressure on the flange 46' is released the action of the springs 47 pressing against the lugs 48 forces the metal shield upward and retains it in the upper position, as is shown in Fig. 9.

In order to place the magazine wrap or transfer tail on the bobbin 25, there is provided, as is shown in Fig. 7, a forked wire yarn guide generally indicated by reference numeral 50 having an upper tine 51, a lower tine 52 ending in a retaining loop 53 (see Fig. 5) and having a manipulating lever 54 all integral with said yarn guide 50 and constituting portions thereof. Yarn guide 50 is attached to a collar 55 which is rotatably mounted on a sleeve 56. Integral with sleeve 56 is a collar 57 and below the collar 57 in sleeve 56 is a bayonet slot 58. Sleeve 56 is rotatably mounted on a fixed pivot stud 59 and the motion of the sleeve 56 along the path of the slot 58 is controlled by a guide pin 60 set in the pivot stud 59. The collar 55 is retained on sleeve 56 by pin 61 set in the said sleeve and passing through a slot 55' in the collar 55. Attached to collar 57 is a bent arm 62 carrying at its free end a freely rotatable flange roller 63.

Figure 6:
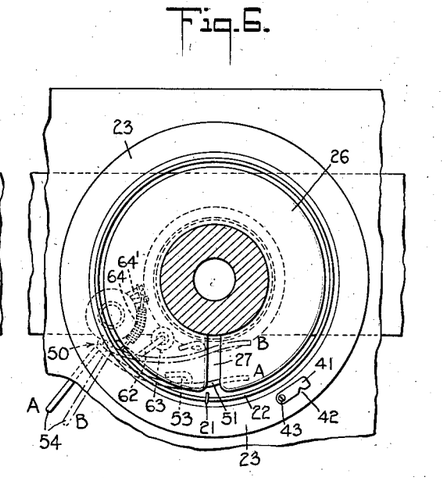
Fig. 6 is a plan view similar to Fig. 5 showing the relative position of the parts during application of the magazine wrap.

In order to maintain the yarn guide 50 in inoperative position, i. e., position A in Figure 6, there is provided a spring 64 one end of which is anchored on arm 62 and the other end of which is anchored on a pin 64' fixed to collar 55. The tension of the spring 64 causes a clockwise pull on collar 55 and tends to keep the lower tine 52 out of contact with arm 62 which carries the roller 63.

In Figure 7 the device of our invention is shown in operative position to form a magazine wrap or transfer tail on the empty bobbin 25 positioned on the spindle 65 adapted to be rotated at a very high rate of speed, i. e., several thousand revolutions per minute, by means of a belt (not shown) driving a whorl 66. To apply a magazine wrap to this empty bobbin the yarn 20 is first threaded through the traveler 21, after catching the thread in the retaining loop 53 of the lower tine 52 of the forked yarn guide 50 as it is shown in Fig. 7, and then looped around the wire yarn guides 40 and the notched guide 41 as previously noted. The throw-on assembly carried on the pivot stud 59 as shown in Fig. 7 is locked into position by means of bayonet slot 58 and guide pin 60 as shown. The entire throw-on assembly is now in the position A shown in Fig. 6. By a suitable pressure on the manipulating lever 54 the throw-on assembly is moved into position B. In this position the flanged roller 62 on arm 61 is forced against the flange 46' of metal shield 46 causing the said shield to be displaced in a downward direction against the pressure of the springs 47. The displacement of the metal shield 46 exposes the circumferential groove 45 while at the same time the upper tine 51 and the lower tine 52 of the forked yarn guide 50 carry the yarn 20 into the radial slot 27 of the bobbin flange 26. The rotating motion of the bobbin carries the yarn along the flange until it is caught in the radial slot 27. This catching causes the yarn passing over yarn guide 41 to be caught in the sharpened edges of notch 42 and to be severed thereby. The length of the yarn 20 from the guide 41 to the loop 53 in tine 52 is wrapped in the groove 45 below the bobbin flange 26 by the rotation of the bobbin while at the same time the upper tine 51 guides the yarn so that it is caused to wind on the bobbin proper above slotted flange 26. The manipulating lever 54 is thereupon released and moved to disengage the guide pin 60 and the assembly on pivot stud 59 is then allowed to drop so that it rests upon guide pin 60 at the upper extremity of the slot 58. This action disengages and releases the pressure of the flanged roller 62 on the metal shield 46 which is thereupon forced upward by the springs 47, thus firmly securing the magazine wrap or transfer tail in position in the groove 45. The winding of the bobbin thereupon proceeds as usual and when it is full it is removed and replaced by an empty one whereupon the operation just described is again effected.

When it is desired to release the magazine wrap or transfer tail a slight downward movement of the metal shield 46 uncovers the magazine wrap or transfer tail and it becomes immediately available. When the yarn package is shipped or handled the metal shield serves to keep the magazine wrap or transfer tail clean and also serves to protect it from abrasion or other injuries.

Figure 10:
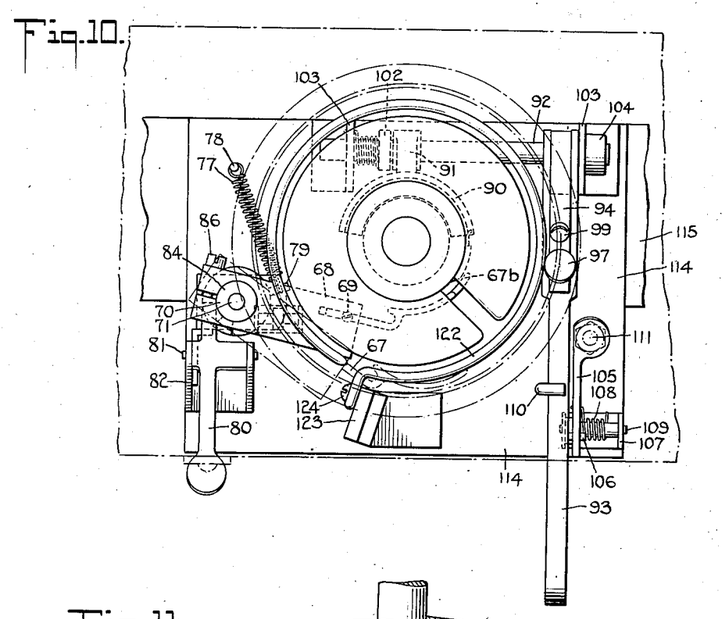
Fig. 10 is a plan view of another embodiment of our invention, showing a yarn guide in operative and inoperative position, the mechanism for moving the yarn guide and a braking mechanism for halting the spindle movement.
Figure 11:
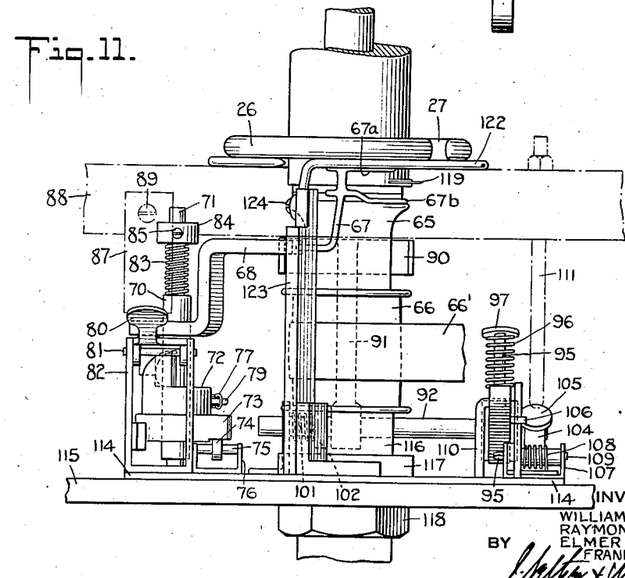
Fig. 11 is a front elevation of this embodiment showing the position of the yarn guide in relation to the bobbin extension upon which the magazine wrap or transfer tail is wound, mechanism for moving the yarn guide and the braking mechanism.
Figure 15:
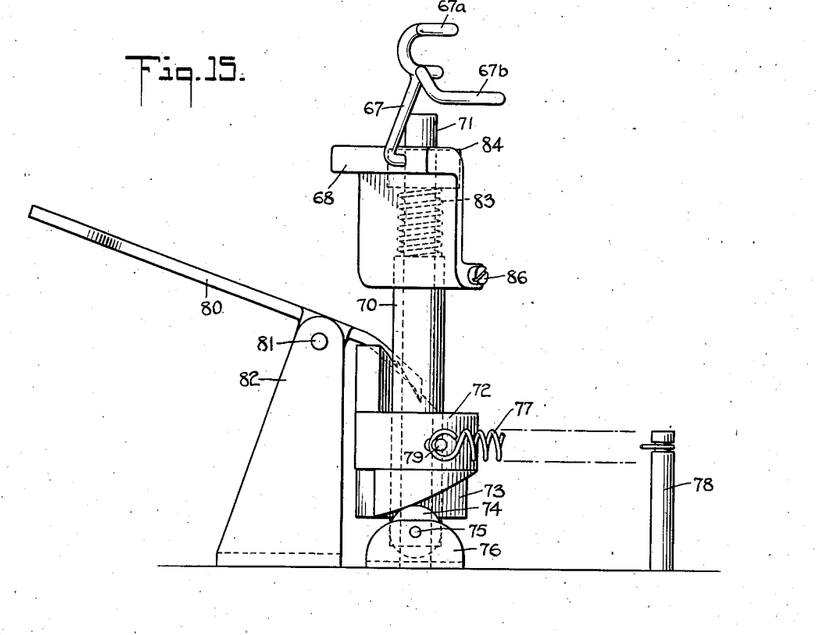
Fig. 15 is a detail view of the means for throwing on and applying the yarn to the bobbin.

In the modification shown in Figs. 10 to 19 of the drawings, a yarn 20 from the spinning metier (not shown) is threaded through a traveler 21 mounted on a spinning ring 22. The yarn is then passed around a yarn guide 67 (see Figs. 12 and 15) which is provided with an upper member 67a which is curved into a hook and a lower fork 67b which has a sharpened edge. The yarn guide 67 which is adapted to throw the yarn on to the bobbin 25, is mounted in a support 68 and is adjustably held in position on the support 68 by a screw 69 as shown in Fig. 10. The support 68 is mounted firmly on the upper part of sleeve 70, as shown in Fig. 15, which sleeve is in turn journaled on a stud 71 and is free to move vertically and circumferentially in relation to said stud, carrying the support 68 with it. Also mounted on the sleeve 70 is a notched collar 72 and a lifting cam 73. The lifting cam 73 is set on a roller 74 which is rotatably mounted on a shaft 75 supported in a bracket 76. A torsional turning moment tending to cause the sleeve to turn and the lifting cam 73 to lift on roller 74 is exerted on the entire assembly carried on the sleeve 70 by a spring 77 one end of which is attached to an anchor stud 78 and the other end to a pin 79 fixed to the notched collar 72. The turning of the sleeve is normally prevented by trigger 80 which engages the notched collar 72 as shown in Fig. 15. The trigger 80 is pivoted on a shaft 81 supported in a bracket 82. The entire sleeve assembly is maintained at its most extreme downward position by the pressure of a spring 83 against collar 84 held in position on the stud 71 by a screw 85, as shown in Fig. 11. The support 68 is held firmly in place on the sleeve 70 by a screw 86 by means of which the support may be adjusted to any desired position. Pressure on the trigger 80 releases it from the notch on notched collar 72 and the tension of the spring 77 which is now free to act causes the entire sleeve assembly to describe a turning motion about the stud 71 and a lifting motion on the cam 73, thus causing the yarn guide 67 to force the yarn carried thereby toward the bobbin 25 in a motion preliminary to the formation of the magazine wrap or transfer tail. The trigger 80 may be tripped automatically by an adjustable trip lever 87 which is attached to the ring rail 88 by a screw 89.

To obtain the magazine wrap in accordance with this embodiment of our invention, the empty bobbin 25 set on a spindle 65 which is rotated by a belt 66' in contact with the whorl 66 of the spindle is first brought to a stop by means of a braking assembly. The braking mechanism comprises a brake shoe 90 held on an arm 91 which is rigidly attached to a shaft 92. The lever for operating the brake is divided into a main lever 93 which is journaled on shaft 92 and an auxiliary lever 94 which is rigidly attached to shaft 92. The main braking lever 93 is flexibly attached to the auxiliary lever 94 by an adjustable screw 95 threaded through the main lever 93 and a tension spring 96 interposed between the auxiliary lever 94 and the head 97 of the adjustable screw 95. The adjustable screw 95 may be locked at any desired position by means of lock nut 98. The distance between the main braking lever 93 and the auxiliary lever 94 is adjustable by means of set screw 99 which may be locked in position by lock nut 100. The braking assembly is held under a torsional tension which tends to keep the brake shoe 90 out of contact with the spindle 65 by means of a tension spring 101 the tension of which may be adjusted by means of collar 102. The shaft 92 of the braking assembly which carries the brake shoe 90 and arm 91 as well as the braking levers 93 and 94 is rotatably mounted and supported in brackets 103 and is kept from lateral movement by collar 104.

Figures 12, 13, 14:
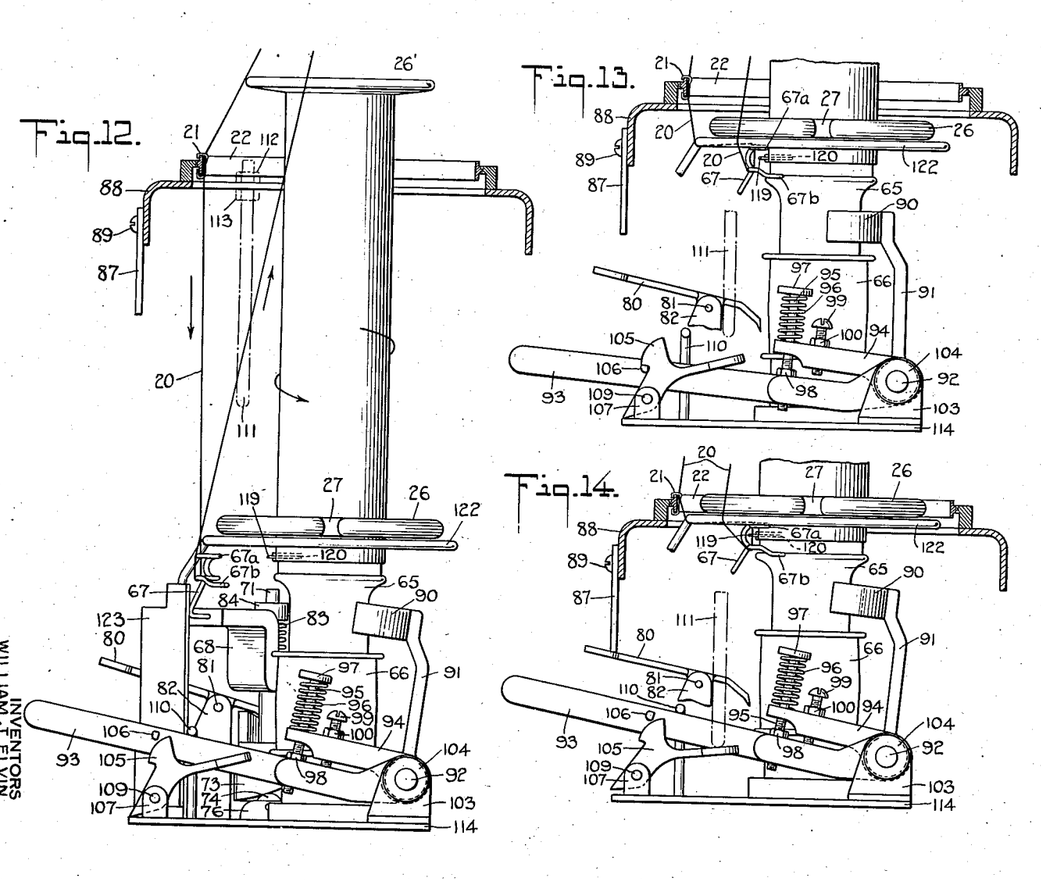
Fig. 12 is a side elevation of this embodiment showing the flanged bobbin, the ring, traveler and ring rail, and braking means for halting the whirling motion of the spindle and the yarn guide in inoperative position.
Fig. 13 is a view showing the braking means in operative position.
Fig. 14 is a view showing the braking means in inoperative position.

The braking assembly may be locked in position with brake shoe 90 in contact with the spindle 65 as shown in Fig. 13, by notched spring loaded release trigger 105. By forcing the main braking lever sufficiently far downward against the pressure of the spring 96, the notched spring-loaded trigger 105 catches upon the pin 106 on main lever 93 and locks the lever and brake shoe 90 in braking position. The release trigger 105 is mounted in bracket 107 and is maintained under a counter-clockwise tension by spring 108, the trigger 105 being rotatably mounted on a shaft 109. The maximum upward movement of the main braking lever 93 is controlled by a stop 110. The trigger 105 may be automatically released or tripped by the arm 111 attached to the ring rail by any suitable means such as adjusting nuts 112 and 113.

The brake mechanism and the yarn guide actuating mechanism are mounted on a base plate 114 which is in turn mounted on a rail 115. The spindle mechanism is held in place by the usual means and rests on a bolster 116 which is held in position by an upper adjusting and retaining nut 117 and a lower adjusting and retaining nut 118 as shown in Fig. 11.

Figure 16:
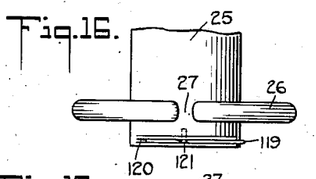
Figs. 16 and 17 are detail views of the base of one form of bobbin used in this embodiment of our invention.
Figure 17:
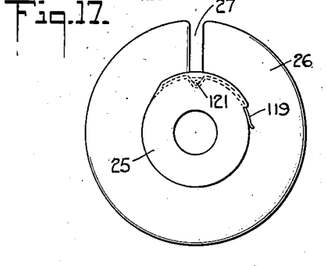
Figure 18:
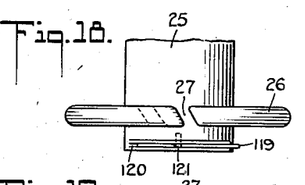
Figs. 18 and 19 are detail views of the base of another form of bobbin which may be used with this embodiment of our invention.
Figure 19:
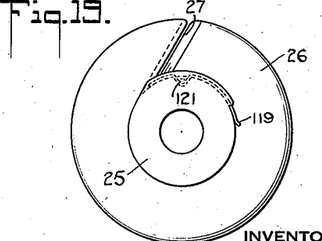

The bobbin 25 upon which the yarn is wound and upon which the magazine wrap or transfer tail is applied utilizing the mechanism heretofore described is provided with a flange 26 at its lower extremity which flange has a slot 27. The slot may be cut along a diameter of the bobbin as shown in Figs. 16 and 17 or the slot may be tangential as shown in Figs. 18 and 19 or otherwise angularly disposed. The top flange 26' of the bobbin is not slotted. Set in the base of the bobbin 25 below the flange 26 is a bent wire hook 119 countersunk in a shallow slot 120 and held by a screw 121. One end of the wire hook 119 emerges from the slot 120 as shown. The bobbin and its concomitant parts may be of a unitary structure or it may be assembled from several pieces.

The magazine wrap or transfer tail is applied to the bobbin in the following manner. The yarn 20 is threaded around the yarn guide 67, as described, while the yarn guide is in the position as shown in Figs. 12 and 15. The notched collar 72 is locked in position against the tension of the spring 77 by the trigger 80 in which position the yarn guide is kept away from the bobbin base. When the ring rail is above the center of its downward stroke, the brake lever 93 is forced downward by manual pressure and the brake shoe 90 is brought in contact with and halts the motion of the spindle 65. The brake is locked in braking position by the notched trigger 105 as shown in Fig. 13. The downward motion of the ring rail 88 brings the trip 87 in contact with the trigger 80 which causes it to be slipped from the notched collar 72. When the notched collar 72 is released the tension of the spring 77 pulls it around, causing the entire assembly on sleeve 70 to turn and to rise on the lifting cam 73. The combined turning and lifting movement brings the yarn and yarn guide into contact with the stationary bobbin base as shown in Fig. 13. The continued downward movement of the ring rail 88 brings the arm or trip 111 into contact with the trigger 105 which frees the pin 106 and permits the spring 101 to carry the brake shoe 90 back away from the spindle 65. The release of the braking mechanism permits the spindle to rotate and pick up speed. As the wire hook 119 moves past the yarn guide 67, it catches or firmly hooks the yarn 20. Just subsequent to the release of the braking mechanism the peripheral speed of the barrel of the bobbin closely approximates the lineal speed of the yarn from the metier. The hooked yarn is kept from coming in contact with the bobbin flange 26 by the auxiliary yarn guide 122 which extends almost completely around the bobbin flange and is supported by a bracket 123 and held in position by a screw 124. The yarn is pulled by the hook 119 past the sharpened lower fork 67b of the yarn guide 67 where the loose end is severed. The rotation of the bobbin 25 and the yarn guide 122 causes the yarn to wrap around the bobbin base below the flange 26 for several wraps and when the yarn is carried around to the open portion of the auxiliary yarn guide 122 by the pull of rotating bobbin, the yarn slips through and enters the radial slot 27 in the base flange 26 of the bobbin. The winding and twisting of the yarn then proceeds as usual with the traversing of the ring and traveler forming the package. When the package is full the bobbin is removed and an empty bobbin substituted. To repeat the operation the yarn is again threaded around the yarn guide 67 and the yarn guide locked out of position. The brake is then applied halting the turning spindle. When the ring rail moves downward the triggers are tripped in the sequence described thus throwing the yarn in the path of the hook. The automatic release of the brake permits the spindle again to rotate thus carrying the yarn on to the bobbin and forming the magazine wrap or transfer tail as the yarn is wound.

The magazine wrap or transfer tail formed in this manner is firmly held in position by the tension of the projecting wire hook and may be easily detached when it is desired to free the end for the warping or other textile operation for which the yarn is to be used.

It is to be understood that the foregoing detailed description is given merely by way of illustration and that many variations may be made therein without departing from the spirit of our invention.

Having described our invention, what we desire to secure by Letters Patent is:

1. In a ring spinning device for winding yarn on a flanged bobbin the barrel of which has an extension thereon, the combination with means for holding said bobbin in a vertical position, of a guide movable below the bottom flange of said bobbin for bringing the yarn into contact with said extension and for causing a small amount of yarn to be wound thereon, said small amount of yarn being available for use as a transfer tail.

2. In a ring spinning device for winding yarn on a flanged bobbin the barrel of which has an extension thereon, the combination with means for holding said bobbin in a vertical position, of a yarn guide and means for moving said yarn guide below the bottom flange of said bobbin for bringing the yarn into contact with said extension and for causing a small amount of yarn to be wound thereon, said small amount of yarn being available for use as a transfer tail.

3. In a ring spinning device for winding yarn on a flanged bobbin the barrel of which has an extension thereon, the combination with means for holding said bobbin in a vertical position, of a yarn guide and manually operated means for moving said yarn guide below the bottom flange of said bobbin for bringing the yarn into contact with said extension and for causing a small amount of yarn to be wound thereon, said small amount of yarn being available for use as a transfer tail.

4. In a device for producing yarn packages having a transfer tail, the combination with means including a spinning ring and traveler for winding yarn on a yarn holder having an extension thereon, of means for adjusting the position of the spinning ring and traveler relative to said yarn holder so as to wind a relatively small amount of yarn on the extension of said yarn holder, said small amount of yarn being available for use as a transfer tail.

5. In a device for producing yarn packages having a transfer tail, the combination with means including a spinning ring and traveler for winding yarn on a yarn holder having an extension thereon, of means cooperating with said spinning ring for moving said spinning ring through a predetermined path relative to said yarn holder so as to cause a winding of a relatively small amount of yarn on the extension of said yarn holder, said small amount of yarn being available for use as a transfer tail.

6. In a device for producing yarn packages having a transfer tail, the combination with means including a spinning ring and traveler for winding yarn on a yarn holder having an extension thereon, of means including a plurality of slots spaced from said spinning ring and a plurality of pins fixed to said spinning ring and cooperating with said slots for moving said spinning ring through a predetermined path relative to said yarn holder so as to cause a winding of a relatively small amount of yarn on the extension of said yarn holder, said small amount of yarn being available for use as a transfer tail.

7. In a device for producing yarn packages having a transfer tail, the combination with means including a spinning ring and traveler for winding yarn on a yarn holder having an extension thereon, of means including a plurality of slots spaced from said spinning ring, a plurality of pins fixed to said spinning ring and cooperating with said slots, and a lever fixed to said spinning ring for moving said spinning ring through a predetermined path relative to said yarn holder to a position co-extensive with the extension on the yarn holder so as to cause a winding of a relatively small amount of yarn on the extension of said yarn holder, said small amount of yarn being available for use as a transfer tail.

8. In a device for producing yarn packages having a transfer tail, the combination with means including a spinning ring and traveler for winding yarn on a bobbin having an extension thereon, of means including a plurality of slots spaced from said spinning ring, a plurality of pins fixed to said spinning ring and cooperating with said slots, a lever fixed to said spinning ring for moving said spinning ring through a path determined by said slots and to a position co-extensive with said extension on the bobbin and a spring normally holding said lever in inoperative position, the construction and arrangement being such that the movement of the lever to operative position causes a winding of a relatively small amount of yarn on the extension of said bobbin, said small amount of yarn being available for use as a transfer tail.

9. In a device for producing yarn packages having a transfer tail, the combination with means for winding yarn on a yarn holder of a yarn guide, means for bringing said yarn guide into operative position, means for controlling the path of said yarn guide and means for severing the guided yarn to cause a relatively small amount of yarn to be wound on the extension of the yarn holder, said small amount of yarn being available for use as a transfer tail.

10. In a device for producing yarn packages having a transfer tail, the combination with means for winding yarn on a bobbin, a yarn guide, a rotatably mounted collar holding the yarn guide, a slotted sleeve mounted on a vertical shaft for bringing said yarn guide and collar into operative position and means for severing the yarn, the construction and arrangement being such that the movement of the yarn guide to operative position causes a relatively small amount of yarn to be wound on the extension of the bobbin, said small amount of yarn being available for use as a transfer tail.

11. In a device for producing yarn packages having a transfer tail, the combination with means for winding yarn on a yarn holder having an extension thereon, of braking means for the yarn winding means, means for locking said braking means in operative position, means for tripping said brake locking means for releasing said yarn winding means, a yarn guide normally spaced from said yarn holder, and means for bringing said yarn guide into operative position to cause a relatively small amount of yarn to be initially wound on the extension of the yarn holder, said small amount of yarn being available for use as a transfer tail.

12. In a device for producing yarn packages having a transfer tail, the combination with means for winding yarn on a yarn holder having an extension thereon, of braking means for the yarn winding means, a lever for operating said braking means, a pin on said lever and a trigger adapted to catch said pin and lock said braking means in operative position, means for tripping said trigger to release said brake and said yarn winding means, a yarn guide normally spaced from said yarn holder and means for bringing said yarn guide into operative position to cause a relatively small amount of yarn to be initially wound on the extension of the yarn holder, said small amount of yarn being available for use as a transfer tail.

13. In a device for producing yarn packages having a transfer tail, the combination with means for winding yarn on a yarn holder having an extension thereon, of braking means for the yarn winding means, a lever for operating said braking means, a pin on said lever and a trigger adapted to catch said pin and lock said braking means in operative position, means for tripping said trigger to release said brake and said yarn winding means, a yarn guide normally spaced from said yarn holder and rotatably mounted on a stud by means of a sleeve, a cam for lifting and turning said sleeve, and means for actuating said cam to bring said yarn guide into operative position to cause a relatively small amount of yarn to be initially wound on the extension of the yarn holder, said small amount of yarn being available for use as a transfer tail.

14. In a device for producing yarn packages having a transfer tail, the combination with means for winding yarn on a bobbin having an extension thereon, of braking means for the yarn winding means, a lever for operating said braking means, a pin on said lever and a trigger adapted to catch said pin and lock said braking means in operative position, means for tripping said trigger to release said brake and said yarn winding means, a yarn guide normally spaced from said yarn holder and rotatably mounted on a stud by means of a sleeve, a cam for lifting and turning said sleeve, and a spring for actuating said cam to bring said yarn guide into operative position to cause a relatively small amount of yarn to be initially wound on the extension of the bobbin, said small amount of yarn being available for use as a transfer tail.

WILLIAM J. ELVIN.
RAYMOND D. REEL.
ELMER R. STAHL.
FRANK W. SCHULTE.